United States Patent [19]

Lerner

[11] Patent Number: 5,752,208
[45] Date of Patent: May 12, 1998

[54] AUTOMATIC GAIN CONTROL OF A TORQUE SENSOR FOR A POWER ASSIST STEERING SYSTEM

[75] Inventor: Oded Lerner, Torrance, Calif.

[73] Assignee: TRW Inc., Lyndhurst, Ohio

[21] Appl. No.: 538,496

[22] Filed: Sep. 29, 1995

[51] Int. Cl.$^6$ ............................................. B62D 5/04
[52] U.S. Cl. ........................... 701/41; 364/508; 364/571.01
[58] Field of Search ....................... 364/424.051, 424.052, 364/571.01, 508; 180/443; 73/765, 862.321; 701/41, 42

[56] References Cited

U.S. PATENT DOCUMENTS

| | | | |
|---|---|---|---|
| 3,084,294 | 4/1963 | Vallese | 331/109 |
| 3,778,710 | 12/1973 | Snook | 324/123 R |
| 3,797,305 | 3/1974 | Haskell | 73/136 A |
| 4,213,348 | 7/1980 | Reinertson et al. | 73/765 |
| 4,414,852 | 11/1983 | Mcneil | 73/765 |
| 4,540,937 | 9/1985 | Asars | 324/96 |
| 4,598,787 | 7/1986 | Drutchas | 180/79.1 |
| 4,629,952 | 12/1986 | Shimizu | 318/432 |
| 4,660,671 | 4/1987 | Behr et al. | 180/142 |
| 4,887,682 | 12/1989 | Drutchas et al. | 180/79.1 |
| 5,020,617 | 6/1991 | Oshita et al. | 180/79.1 |
| 5,082,076 | 1/1992 | Oshita et al. | 180/79.1 |
| 5,239,490 | 8/1993 | Masaki et al. | 364/565 |
| 5,253,725 | 10/1993 | Nishimoto | 180/79.1 |
| 5,394,760 | 3/1995 | Persson et al. | 73/862.331 |
| 5,517,415 | 5/1996 | Miller et al. | 364/424.05 |

*Primary Examiner*—Michael Zanelli
*Attorney, Agent, or Firm*—Tarolli, Sundheim, Covell, Tummino & Szabo

[57] ABSTRACT

A control circuit (33) controls the gain of a torque sensor (32) of a type providing two output signals ($V_{o2}$, $V_{o3}$) where the two output signals have values functionally related to a value of an input drive signal ($V_D$) and torque sensed by the torque sensor. The two values varies substantially equally and oppositely from each other in response to sensed torque. A variable gain amplifier (36) provides the input drive signal. A rectifiers/filters circuit (38) monitors the two output signals of the torque sensor. A gain control circuit (50) controls the gain of the drive signal in response to the sum of the monitored two output signals of the torque sensor relative to a reference voltage.

10 Claims, 2 Drawing Sheets

AUTOMATIC GAIN CONTROL OF A TORQUE SENSOR FOR A POWER ASSIST STEERING SYSTEM

TECHNICAL FIELD

The present invention is directed to a power assist steering system and is specifically directed to an automatic gain control arrangement for a steering torque sensor of a power assist steering system.

BACKGROUND OF THE INVENTION

Torque sensors are known in the art. A typical torque sensor is attached to a member for measuring torque applied to that member. The torque sensor provides an electrical output signal having a characteristic which is functionally related to the torque applied to the member. The output signal is typically used to control an associated device. For reliable control of the associated device, the functional relationship between the torque applied to the member and the output signal must be stable.

Torque sensors for power assist steering systems are also known in the art. A typical torque sensor for a power assist steering system is operatively connected between a steering input shaft and an output shaft. The input shaft is connected to the steering wheel and the output shaft is connected to a pinion of a rack and pinion steering gear. The torque sensor includes a torsion bar connecting the input shaft to the output shaft. The torque sensor further includes a rotary position sensor adapted to monitor the amount of relative rotation between the input shaft and the output shaft that occurs as torque is applied to the steering wheel. The amount of relative rotation is functionally related to the strength of the torsion bar and the amount of steering torque applied to the steering wheel.

One problem that exists is that the torque sensor output signal may develop an electrical offset. An electrical offset can result in improper operation of the device being controlled. Also, electrical offsets occur due to sensor aging, temperature changes, supply voltage changes, and sensor element misalignment. The consequences of an electrical offset is of particular concern to the art of vehicle power steering systems.

U.S. Pat. No. 4,887,682 to Drutchas et al., discloses an apparatus for nullifying electrical offsets in a torsion sensor. The system includes a torque sensor that provides a torque output signal indicative of applied steering torque. A mechanical switch detects a zero torque condition and provides a signal indicative of such a condition through a low pass filter to a detector circuit. When the detector circuit signals a zero torque condition exists, it causes a sample and hold circuit to sample the torque output signal. The sample and hold circuit outputs a signal indicative of the sampled zero torque value of the torque output signal. A differencing circuit determines the difference between the sampled zero torque value and a reference zero torque value, and outputs an error signal indicative of that difference. The error signal is provided to a compensator circuit, which modifies the value of the torque output signal as a function of the error value. This modified torque output signal is used by a control unit to control an electric motor drive circuit.

U.S. Pat. No. 4,660,671 to Behr et al. discloses an electric power steering system that includes two torsion sensors A and B and a plurality of fault detection circuits for detecting various system fault conditions. One such fault detection circuit provides a sensor-to-sensor check of the two torsion sensors A and B. Each sensor has an output value of 4 volts D.C. when no input torque is applied to the vehicle steering wheel. The two output signals are ratiometric, i.e., as input torque is applied to the steering wheel, the output signals vary equally and oppositely from their "no input torque" values. The difference between the two output signals is indicative of the torque applied to the steering wheel. Because the sensor outputs signals vary equally and oppositely, their sum should remain constant. The fault detection circuit adds the two signals to assure that their sum does, in fact, remain constant. If the summation varies from the constant value by more than a predetermined amount, operation of an electric power assist motor is disabled.

U.S. Pat. No. 5,394,760 to Persson et al. is directed to a vehicle power steering system that includes a single torque sensor. An a.c. signal drives the sensor input and two ratiometric a.c. output signals are output from the sensor. The difference between the two ratiometric output signals indicates the torque applied to the steering wheel. The amplitudes of the two output signals are functionally related to the torque applied to the vehicle steering wheel and the amplitude of the a.c. input signal.

SUMMARY OF THE INVENTION

A method and apparatus are provided for automatically controlling the gain of a torque sensor.

In accordance with one aspect of the present invention, an apparatus is provided for controlling gain of a torque sensor of a type providing an output signal having a value functionally related to a value of an input drive signal and torque sensed by the torque sensor. The apparatus comprises variable gain amplifier means for providing the input drive signal. Means are provided for monitoring an output of the torque sensor. Means are provided for adjusting the gain of the drive signal in response to the torque output signal.

In accordance with another aspect of the present invention, a method is provided for controlling gain of a torque sensor of a type providing an output signal having a value functionally related to a value of an input drive signal and torque sensed by the torque sensor. The method comprises the steps of providing the input drive signal with a controllable voltage value monitoring an output of the torque sensor, and adjusting the value the drive signal in response to the torque sensor output signal.

BRIEF DESCRIPTION OF THE DRAWINGS

Other features and advantages of the present invention will become apparent to those skilled in the art to which the present invention relates from a reading of the following detailed description with reference to the accompanying drawings, in which.

DESCRIPTION OF A PREFERRED EMBODIMENT

Figure 1:
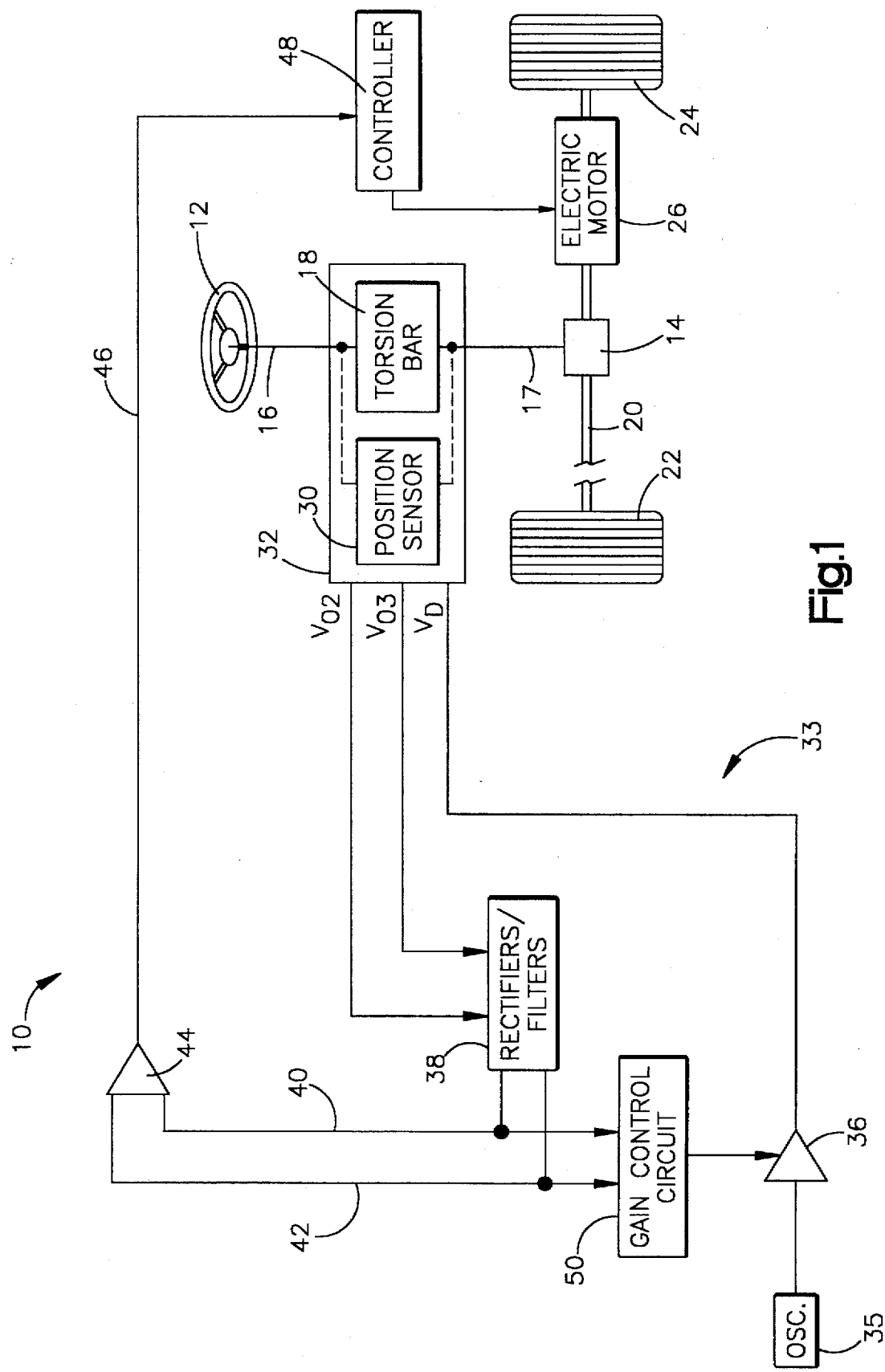
FIG. 1 is a schematic-block diagram illustrating a power assist steering system having a torque sensor arrangement made in accordance with the present invention.

Referring to FIG. 1, a power assist steering system 10 includes a steering wheel 12 operatively connected to a pinion gear 14. The steering wheel 12 is connected to an input shaft 16 and the pinion gear 14 is connected to an output shaft 17. The input shaft 16 is operatively connected to the output shaft 17 through a torsion bar 18 in a manner well known in the art. The torsion bar 18 twists in response to steering torque applied to the steering wheel 12 thereby permitting relative rotation between the input shaft 16 and the output shaft 17 about a common axis.

The pinion gear 14 has helical teeth which meshingly engage with straight cut teeth of a rack or linear steering member 20. The pinion gear 14 in combination with the straight cut gear teeth on the rack member 20 form a rack and pinion gear set. The rack member 20 is coupled to the vehicle's steerable wheels 22, 24 with steering linkage in a known manner. When the steering wheel 12 is turned, the rack and pinion gear set converts the rotary motion of the steering wheel into linear motion of the rack member 20. When the rack member 20 moves linearly, the steerable wheels 22, 24 pivot about their associated steering axes and the vehicle is steered.

An electric assist motor 26 is drivingly connected to the rack member 20 through a ball-nut drive assembly (not shown) in a known manner. When the motor 26 is energized, it aids in the linear movement of the rack member thereby providing power assist for rotation of the steering wheel 12 by the vehicle operator.

A position sensor 30 is operatively connected across the input shaft 16 and the output shaft 17. The position sensor 30 senses the relative rotational position between the input shaft 16 and the output shaft 17 and provides an electric signal indicative thereof. Because the torsion bar 18 connects the input shaft 16 with the output shaft 18, the amount of relative rotation therebetween is functionally related to the strength of the torsion bar and the amount of the torque applied to the steering wheel 12. Thus, the position sensor 30 and the torsion bar 18, in combination, form a torque sensor 32.

An automatic gain control circuit 33 is operatively connected to the torque sensor 32. The automatic gain control circuit 33 includes an oscillator 35 that provides an oscillating electric signal having predetermined frequency and amplitude characteristics. The output of the oscillator 35 is connected to a variable gain amplifier 36. The variable gain amplifier 36 amplifies the oscillator output signal and provides a drive signal $V_D$ to the torque sensor 32. The gain of the variable gain amplifier 36 controls the amplitude of the drive signal $V_D$.

The torque sensor 32 may be any of several types known in the art. Preferably, the torque sensor 32 is of the type disclosed in U.S. Pat. No. 5,394,760 to Erland K.

Persson et al., assigned to the assignee of the present application, and which is hereby fully incorporated herein by reference. The torque sensor 32 outputs two a.c. output signals $V_{O2}$ and $V_{O3}$ having amplitudes that are functionally related to both the value of the drive signal $V_D$ and the torque applied to the steering wheel 12. The torque sensor 32 for use with the present invention must be of a type that outputs two signals indicative of applied steering torque wherein the torque signals vary equally an oppositely from each other in response to applied steering torque.

The outputs $V_{O2}$ and $V_{O3}$ of the torque sensor 32 are connected to a rectifiers/filters circuit 38. The rectifiers/filters circuit 38 outputs two d.c. signals 40, 42 which are the rectified and filtered form of the input signals $V_{O2}$ and $V_{O3}$, respectively. The output signals 40, 42 are d.c. signals having amplitudes functionally relative to the steering torque. The torque sensor 32 is of a type where the values of signals 40, 42 vary equally and oppositely in response to applied steering torque. The output signals 40, 42 are connected to a difference amplifier 44. The difference amplifier 44 outputs a torque signal 46 having a value indicative of the difference between the rectified/filtered output signals $V_{O2}$ and $V_{O3}$ which is, in turn, indicative of the torque applied to the steering wheel 12.

The torque signal 46 is supplied to a controller 48. Preferably, the controller 48 is a microcomputer. The controller 48 separates the torque signal 46 into a directional signal and a magnitude signal. The controller 48 utilizes the directional and magnitude signals for control of the electric motor 26 and, in turn, the amount of power assist.

The output signals 40, 42, are also provided to the inputs of a gain control circuit 50. Since, as mentioned above, the output signals 40, 42 vary equally and oppositely from each other in response to applied steering torque, the sum of the two signals should remain at a constant value. The gain control circuit 50 sums the two output signals 40, 42. The gain control circuit 50 further compares the sum against a reference voltage and outputs a signal indicative of the difference between the summed value and the reference value.

The output of the gain control circuit 50 is connected to a gain control input of the variable gain amplifier 36. The gain of the variable gain amplifier 36 is, in accordance with the present invention, controlled with the described feedback arrangement. The rectifiers/filters circuit 38, the gain control circuit 50, and the amplifier 36 form the automatic gain control circuit 33. The automatic gain control circuit 33 controls the amplitude of the drive signal $V_D$. The amplitude of the drive signal $V_D$ is controlled such that the sum of the two torque output signals $V_{O2}$ and $V_{O3}$ is equal to the predetermined reference value.

Figure 2:
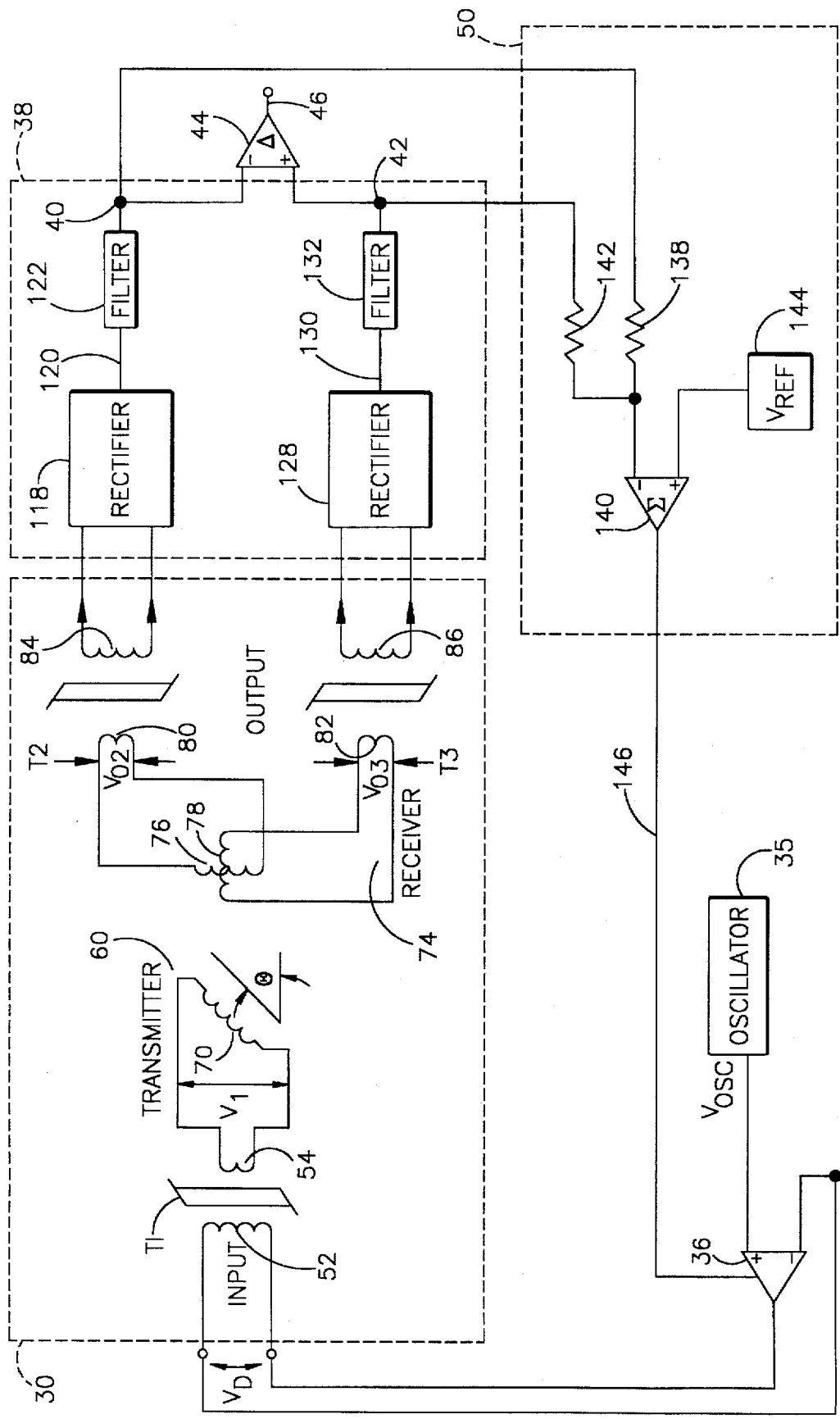
FIG. 2 is a schematic block diagram of an automatic gain control circuit for the torque sensor of FIG. 1 made in accordance with the present invention.

Referring to FIG. 2, details of the gain control circuit 33 will be better appreciated. As mentioned, when steering torque is applied to the steering wheel 12, the torsion rod 18 twist thereby resulting in relative angular rotation between the input shaft 16 and the output shaft 17. It is the extent of this relative rotation that is measured by the position sensor 30.

As mentioned, one specific torque sensor contemplated for use with the present invention, is disclosed in the above-incorporated '760 patent. The drive signal $V_D$ is applied to a rotary input transformer T1 having a stationary primary winding 52 and a rotary secondary winding 54 secured to the input shaft 16. The rotary secondary winding 54 rotates with the input shaft 16 and is connected to a transmitter coil 70. The transmitter coil 70 also rotates with the input shaft 16. A pair of receiver coils 76, 78 are electrically displaced 90° from each other. These coils are axially spaced from the transmitter coil 70 and rotate with the output shaft 17. The receiver coils 76, 78 are respectively connected to the primary windings 80, 82 of output rotary transformers T2 and T3. The primary windings 80, 82 of transformers T2 and T3 also rotate with the output shaft 17. The secondary windings 84, 86 of transformers T2 and T3 are stationary and provide the output signals $V_{O2}$ and $V_{O3}$.

The torque sensor 32 is adapted so that the peak-to-peak values of the output voltage $V_{O2}$ and the output voltage $V_{O3}$ will vary equally and oppositely from a null voltage value $V_{null}$, i.e., the voltage value when no steering torque is applied to the steering wheel 12. However, the value of these voltages may not vary exactly equally and oppositely in response to applied steering torque. The automatic gain control circuit 33 corrects for such deviation.

In FIG. 2, the position sensor 30 is driven by an oscillator through a variable gain amplifier 36. The oscillator 36 provides a signal $V_{OSC}$ having certain frequency and amplitude characteristics. The oscillator signal $V_{OSC}$ is given by the equation $V_{OSC}=a\sin(\omega t)$. The voltage controlled amplifier 36 amplifies the oscillator signal $V_{OSC}$ and outputs a drive signal $V_D$. The drive signal $V_D$ may be expressed as $V_D=A\sin(\omega t)$ where A is the amplitude established by the voltage controlled amplifier 36. The gain of the voltage controlled amplifier 36 determines the value of the amplitude A (i.e., A=gain×a). The gain control circuit 50 controls the gain of the variable gain amplifier 36.

The position sensor 30 provides the two output signals $V_{O2}$ and $V_{O3}$. The signal $V_{O2}$ is output through the secondary coil 84 to a rectifier 118. The rectifier 118 rectifies the signal $V_{O2}$ and outputs a rectified signal 120 to a low pass filter 122. The low pass filter 122 filters the rectified signal 120 and outputs the DC signal 40 having a value functionally related to the signal $V_{O2}$. The signal 40 is output to one input of the difference amplifier 44. The signal $V_{O3}$ is output through the secondary coil 86 to a rectifier 128, which rectifies the signal $V_{O3}$ and outputs a rectified signal to a low pass filter 132. The low pass filter 132 filters the rectified signal 130 and outputs the DC signal 42 having a value functionally related to the signal $V_{O3}$. The signal 42 is connected to other input of the difference amplifier 44.

The difference amplifier 44 determines the difference between the two filter output signals 40 and 42 and provides the torque signal 46 indicative of that difference. The difference between the filter output signals is indicative of the torque applied to the steering wheel 12. Thus, the torque signal 46 is indicative of torque applied to the steering wheel 12. The torque signal 38 is utilized by the controller 48 (see FIG. 1) in controlling operation of the motor 26.

The signal 40 is further output through a resistor 138 to one input of a summing amplifier 140. The signal 42 is output through a resistor 142 to the same input of the summing amplifier 140. A voltage reference 144 provides a known precision voltage to the other terminal of the summing amplifier 140. The summing amplifier 140 sums the filter output signals 40, 42 and determines the difference between that sum and the value of the voltage reference 144. The summing amplifier 140 outputs the control signal 146, which is indicative of that difference, to the gain control input of the variable gain amplifier 36.

The value of the control signal 146 controls the gain of the variable gain amplifier 36. The gain of the variable gain amplifier 36, in turn, controls the amplitude of the drive signal $V_D$. When the value of the control signal 146 changes, the amplitude of the drive signal $V_D$ changes accordingly. A change in the amplitude of the drive signal $V_D$ results in changes in the amplitudes of the output signals $V_{O2}$ and $V_{O3}$.

From the above description of preferred embodiments of the invention, those skilled in the art will perceive improvements, changes and modifications. Such improvements, changes and modifications within the skill of the art are intended to be covered by the appended claims.

Having described the invention, the following is claimed:

1. An apparatus for controlling gain of a torque sensor of a type providing two output signals, each output signal having a value functionally related to a value of an input drive signal and torque sensed by said torque sensor, said apparatus comprising:

variable gain amplifier means for providing said input drive signal;

means for monitoring the two output signals of said torque sensor; and means for adjusting the gain of said drive signal in response to the values of said monitored two output signals of said torque sensor.

2. The apparatus of claim 1 wherein said adjusting means includes an error detection means for detecting an error in said output signals from said torque sensor and for adjusting the gain of said drive signal in response to said detected error.

3. The apparatus of claim 2 wherein said error detection means includes means for determining the difference between said torque output signals and a reference value, and adjusting the gain of said drive signal in response to said difference.

4. An apparatus for controlling gain of a torque sensor of a type providing two output signals, said two output signals having a value functionally related to a value of an input drive signal and torque sensed by said torque sensor, said two output values varying substantially equally and oppositely from each other in response to sensed torque, said apparatus comprising:

variable gain amplifier means for providing said input drive signal;

means for monitoring the two output signals of said torque sensor; and means for adjusting the gain of said drive signal in response to the values of said monitored two output signals of said torque sensor.

5. The apparatus of claim 4 wherein said means for monitoring the two output signals of said torque sensor include means for summing said two output signals together and wherein said adjusting means includes means for comparing the summed signals against a reference signal and providing a difference signal having a value indicative of said difference, said difference signal being used to adjusting the gain of said drive signal.

6. A method for controlling gain of a torque sensor of a type providing two output signals, each output signal having a value functionally related to a value of an input drive signal and torque sensed by said torque sensor, said method comprising the steps of:

providing said input drive signal with a controllable voltage value;

monitoring the two output signals of said torque sensor; and adjusting the gain of said drive signal in response to the values of said monitored two output signals of said torque sensor.

7. The method of claim 6 wherein said step of adjusting includes detecting an error in said output signals from said torque sensor and adjusting the gain of said drive signal in response to said detected error.

8. The method of claim 7 wherein said step of detecting an error includes determining the difference between said torque output signals and a reference value, and adjusting the gain of said drive signal in response to said difference.

9. A method for controlling gain of a torque sensor of a type providing two output signals, said two output signals having a value functionally related to a value of an input drive signal and torque sensed by said torque sensor, said two output values varying substantially equally and oppositely from each other in response to sensed torque, said method comprising the steps of:

providing a controllable input drive signal to said torque sensor;

monitoring the two output signals of said torque sensor; and adjusting the gain of said drive signal in response to the values of said monitored two output signals of said torque sensor.

10. The method of claim 9 wherein said step of monitoring the two output signals of said torque sensor including summing said two output signals together and wherein said step of adjusting includes comparing the summed signals against a reference signal and providing a difference signal having a value indicative of said difference, and adjusting the gain of said drive signal in response to said difference signal.

* * * * *